United States Patent
Nell

Patent Number: 5,857,800
Date of Patent: *Jan. 12, 1999

[54] ANNUAL SHAFT FLANGE

[75] Inventor: Richard T. Nell, Colgate, Wis.

[73] Assignee: Waukesha Tool & Manufacturing, Inc., Waukesha, Wis.

[*] Notice: This patent issued on a continued prosecution application filed under 37 CFR 1.53(d), and is subject to the twenty year patent term provisions of 35 U.S.C. 154(a)(2).

[21] Appl. No.: 914,400

[22] Filed: Aug. 19, 1997

Related U.S. Application Data

[63] Continuation of Ser. No. 624,993, Mar. 29, 1996, abandoned.

[51] Int. Cl.[6] .................................. F16B 2/24; F16B 7/04
[52] U.S. Cl. ................................... 403/344; 403/DIG. 7; 403/271; 403/263; 411/517
[58] Field of Search ................................ 403/344, 271, 403/263, 261, 327, DIG. 7; 411/517, 353

[56] References Cited

U.S. PATENT DOCUMENTS

| | | | |
|---|---|---|---|
| Re. 18,144 | 8/1931 | Heiermann . | |
| 210,560 | 12/1878 | Robertshaw | 411/517 X |
| 1,952,955 | 3/1934 | Trageser et al. | 403/271 X |
| 3,627,360 | 12/1971 | Berno | 403/195 X |
| 3,703,113 | 11/1972 | Feisel | 82/147 |
| 3,752,515 | 8/1973 | Oaks et al. | 411/517 X |
| 4,068,750 | 1/1978 | Gatewood | 192/111 A |
| 4,116,572 | 9/1978 | Heldemann et al. | 403/344 X |
| 4,149,336 | 4/1979 | Huse | 43/44.9 |
| 4,152,099 | 5/1979 | Bingler | 417/420 |
| 4,373,827 | 2/1983 | Arndt | 403/24 |
| 4,428,697 | 1/1984 | Ruland | 403/344 |
| 4,637,750 | 1/1987 | Ward | 403/261 X |
| 4,640,639 | 2/1987 | Matsui | 403/24 |
| 4,692,053 | 9/1987 | Sampedro | 403/24 |
| 4,763,951 | 8/1988 | Silverman | 297/354 |
| 4,765,769 | 8/1988 | Chapman | 403/24 |
| 4,804,288 | 2/1989 | Tiernan, Jr. | 403/24 |
| 4,890,946 | 1/1990 | Von Pragenau | 403/13 |
| 4,902,156 | 2/1990 | Deisler et al. | 403/24 |
| 4,948,288 | 12/1990 | Medgvesy | 403/24 |
| 5,074,724 | 12/1991 | McCracken | 409/182 |
| 5,085,535 | 2/1992 | Solberg et al. | 403/344 X |
| 5,090,066 | 2/1992 | Schoepe et al. | 402/344 X |
| 5,145,273 | 9/1992 | Hellon et al. | 403/24 |
| 5,201,545 | 4/1993 | Boersma | 280/777 |
| 5,302,046 | 4/1994 | Mathes | 403/370 |
| 5,352,055 | 10/1994 | Hellon et al. | 403/24 |
| 5,353,055 | 10/1994 | Hiramatsu | 348/145 |
| 5,393,160 | 2/1995 | Ojima | 403/120 |
| 5,439,310 | 8/1995 | Evenson et al. | 403/321 |
| 5,509,864 | 4/1996 | Hauser | 403/344 X |

FOREIGN PATENT DOCUMENTS

| | | |
|---|---|---|
| 0381566 | 8/1990 | European Pat. Off. . |
| 0405109 | 1/1991 | European Pat. Off. . |
| 1375773 | 11/1974 | United Kingdom . |

OTHER PUBLICATIONS

TRUARC Brochure, "Interlocking Retaining Ring", Manufactured by Waldes Kohinoor, Inc. Jun. 1965.

*Primary Examiner*—Anthony Knight
*Attorney, Agent, or Firm*—Andrus, Sceales, Starke & Sawall

[57] ABSTRACT

An annular flange which can be positioned on a shaft and securely welded in place. This disclosure also contemplates the method of making an annular shaft flange. This novel flange is materially stronger than the prior art and has lower production costs.

6 Claims, 1 Drawing Sheet

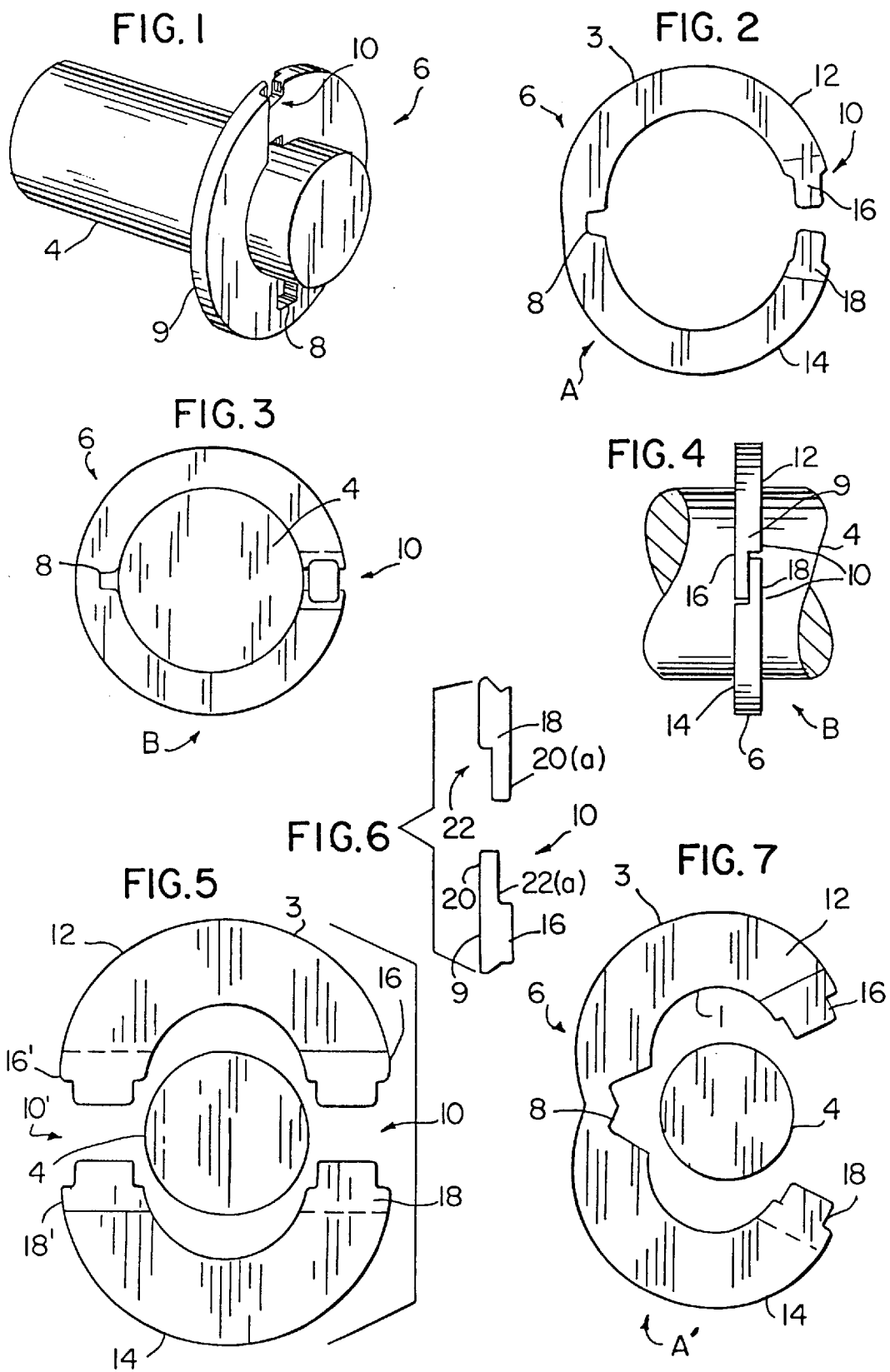

ANNUAL SHAFT FLANGE

This application is a continuation of application Ser. No. 08/624,993 filed Mar. 29, 1996 now abandoned.

BACKGROUND OF THE INVENTION

This invention relates to an annular flange which can be positioned on a shaft and fixed in place. The flange functions as a stop to locate a shaft at a particular distance in a hole or to retain an object in a position on a shaft.

Previous devices, such as snap rings, cotter pins or split pins require the shaft to be machined or drilled, weakening the shaft and adding cost. A locking ring requires no machining, but has a greater cost penalty and can only be placed on the shaft if the diameter of the shaft is constant or has a diameter reduction.

This novel annular flange has numerous advantages over the prior art. The present invention is materially stronger than the prior art snap rings, cotter rings, or split pins and requires no machinery drilling and thus does not weaken the shaft and reduces cost.

This novel shaft flange is also stronger than the prior art. The prior art roughly withstands approximately 400 lbs. of pressure while the present invention withstands approximately 1,200 lbs. of pressure. (See Chart 1.) It also exceeds present methods push-out force by a multiple of two.

The present invention is also easier to assemble, easier to manufacture, has approximately one half lower production costs than the prior art and is only 20% of the weight of the prior art.

This annular flange can be installed at the shaft manufacturing before painting adding yet another advantage over the prior art. Additionally, this flange can encircle the shaft at any point along the shaft unlike the prior art which must be slid over a free shaft end and slid down the circumference of the shaft to the point the flange is to be permanently affixed to the shaft. This trait of the present invention provides much flexibility and wider applications for its use.

This novel annular flange can be used in a myriad of industries such as automotive, lawn and garden, military equipment and machine tools. This device would be useful in any application where there exists a requirement to have two mating parts slide together and stop at a predetermined distance.

CHART 1

| O.D. | Shaft Dia. (Inch) | Flange I.D. (Inch) | Flange Thickness (Inch) | Push Out Force (lb's.) |
|---|---|---|---|---|
| 1.500 | .745 | * | .130 | 1,000 lbs. |
| 1.500 | .770 | * | .130 | 1,250 lbs. |
| 1.040 | .706 | * | .130 | 300 lbs. |
| 1.040 | .716 | * | .130 | 500 lbs. |

*Flange I.D. (Inch)—to be determined by shaft diameter.

SUMMARY OF THE INVENTION

This invention is a stamped ring, or washer, with modifications performed during the stamping process. The washer has a passage of material removed from the outside diameter to the inside diameter. At 180°, a similar channel is removed from the inside diameter stopping short of the outside diameter. The passage is now spread apart to a distance greater than the original inside diameter. On the edges of the passage, two areas are coined reducing the thickness of the washer and extruding material into the gap to a distance greater than half of the original passage width. The ring has now taken the form of a letter "C", being held together by the web of material at the junction of the opposing channel nearing the outer diameter.

This device could alternately be made from two identical halves; the coined areas would now be placed at 180° on a half, with the coined sections made in such a way that a stamped half would have the coined areas nesting when joined together with an identical stamping rotated through 180°. Both sides could then be welded together.

BRIEF DESCRIPTION OF THE DRAWINGS

The drawings illustrate the best mode presently contemplated of carrying out the invention.

In the drawings:

FIG. 1 a perspective of the flange in a closed position around a shaft;

FIG. 2 a top view of the flange alone in the partially open position;

FIG. 3 a top view of the flange alone in the closed position;

FIG. 4 is a side view of the flange in a closed position around a shaft;

FIG. 5 a top view of a second embodiment of the flange in an open position;

FIG. 6 a detailed side view of this invention; and

FIG. 7 a top view of the first embodiment of this invention in a fully open position around a shaft.

DETAILED DESCRIPTION OF THE PREFERRED EMBODIMENT

The annular flange ring of the present invention can be made from any ferrous, non-ferrous or any plastic material that is capable of being welded. This flange could be constructed from 30 the aforementioned in pure element form, or in compound form or as a mixture.

In the preferred embodiment, the subject invention assembly process to the shaft is illustrated in FIG. 1. The annular flange 6 is produced in a progressive die and will be manufactured in the open position A as seen in FIG. 7. The flange 6 can be fed automatically over the shaft 4 at the predetermined position. The invention will then be mechanically closed (to closed position B) as shown in Fig.3, around shaft 4 and positioned to be welded with a resistance-type spot welder. The size (KVA rating) of the welder and the electrode design would depend upon the thickness of the annular flange 6. During the weld cycle, pressure is applied mechanically to the outer diameter 3 of the annular flange 6 and maintained for period to allow the weld to solidify. The pressure would then be released, thus completing the assembly cycle.

FIG. 1 shows the annular flange 6 in the closed position B about a shaft 4. FIG. 1 also displays the hinge channel 8 and width 9.

FIG. 2 illustrates the flange 6 in a partially open position A facilitated by hinge channel 8 (FIG. 7 illustrates the fully open position A'). FIG. 2 is illustrated without the shaft 4 and is a top view of the flange 6. Also illustrated is first arc 12 and second arc 14 as well as nesting area 10. Also shown in FIG. 2 is inner diameter 1 and outer diameter 3.

FIG. 3 illustrates flange 6 in a closed position B around shaft 4. Once flange 6 is closed, it can be permanently kept closed by spot welding nesting area 10.

FIG. 4 is a side view illustrating flange 6 around shaft 4. Width 9 is also shown. By viewing FIGS. 1–4 one can see that first arc 12 has at one end a first arc nest end 16. At the opposing end of first arc 12 is hinge channel 8. Second arc 14 has on one end the second arc nest end 18 and on the opposing end hinge channel 8, which constitutes the only point of attachment between first arc 12 and second arc 14 in partial open position A and fully open position A'.

In the closed position B, first arc nest end 16 is designed to mate with the second arc nest end 18 wherein first arc nest end 16 and second arc nest end 18 can be spot welded to hold the flange 6 in closed position B around shaft 4 permanently.

FIG. 5 illustrates a second embodiment of this invention wherein instead of hinge channel 8 there exists a second nesting area 10'. The first arc 12 and second arc 14 are "C" shaped members. The second nesting area 10' is similar to nesting area 10. First arc 12 has, in this embodiment, a first arc nest end 16 and a first arc second nest end 16'. Second arc 14 likewise has a second arc nest end 18 and a second arc second nest end 18'. The first arc nest end 16 is proportioned similar to the first embodiment to mate with second arc nest end 18. Likewise, first arc second nest end 16' is proportioned to mateably rest with second arc second nest end 18'. Subsequently, nesting area 10 and second nesting area 10' can be welded securing the flange 6 about shaft 4. Also shown in FIG. 5 are inner diameter 1 and outer diameter 3.

FIG. 6 illustrates a detail side view of the nesting end 10 (and is similar to 10') where it is seen that the first arc nest end 16 has a lip 20 which fits into the recess 22 of second arc nest end 18. Second arc nest end 18 also has a lip 20(*a*) which likewise rests in recess 22(*a*) of first arc nest end 16.

Preferably, recess 22 and recess 22(*a*) are one half or less of width 9. Likewise, lip 20 and 20(*a*) are at least one half or greater of width 9.

FIG. 7 illustrates the fully open position A' of flange 6 around shaft 4.

"Open position" is defined within the scope of this invention as partial open position A and fully open position A'.

I claim:

1. An annular shaft flange for attachment to a shaft extending along a longitudinal axis, the shaft flange comprising:

a flange body having a first axial end face and a second axial end face, the first and second axial end faces being parallel and opposed, the first and second axial end faces being spaced to define an axial width of the shaft flange, wherein each of the first and second axial end faces has a radial width extending between an inner curved surface and an outer curved surface, the radial width being substantially larger than the axial width of the shaft flange;

a first nest end and a second nest end formed on the flange body, the first and second nest ends being spaced apart when the annular shaft flange is in an open position;

a hinge channel formed in the flange body to permit the flange body to flex between the open position and a closed position, the hinge channel extending radially outward from the inner curved surface a distance less than the radial width of the flange body;

a first lip extending from the first nest end of the flange body, the first lip having a width of approximately one-half the axial width of the flange body and being spaced inwardly from the first axial end face by a first recess approximately equal to one-half the axial width of the flange body; and a second lip extending from the second nest end of the flange body, the second lip having a width of approximately one-half the axial width of the flange body and being spaced inwardly from the second axial end face by a second recess approximately equal to one-half the axial width of the flange body;

wherein when the flange body is flexed from the open position to the closed position, the first lip is received in the second recess and overlaps the second lip such that the first and second lips can be spot welded to retain the shaft flange in the closed position.

2. The annular shaft flange of claim 1 wherein the annular shaft flange is ring-shaped when the shaft flange is in the closed position.

3. The annular shaft flange of claim 1 wherein the shaft flange is comprised of at least one substance in the group consisting of a non-ferrous metal or a ferrous metal or a combination thereof.

4. The annular shaft flange of claim 1 wherein:

the first lip includes an outer surface that is planar with the second axial end face; and wherein the second lip includes an outer surface that is planar with the first axial end face.

5. An annular shaft flange for attachment to a shaft extending along a longitudinal axis, the shaft flange comprising:

a first generally semi-circular flange body member and a second generally semicircular flange body member, each flange body member having a first axial end face and a second axial end face, the first and second axial end faces being parallel and opposed, the first and second end faces being spaced to define an axial width for each flange body member;

wherein each of the axial end faces of each flange body member has a radial width extending between an inner curved surface and an outer curved surface, the radial width of each flange body member being substantially greater than its axial width;

a first nest end and a second nest end formed on each of the flange body members;

a first lip extending from the first nest end of each flange body member, the first lip having a width of approximately one-half the axial width of the flange body member and being spaced inward from the first axial end face by a first recess equal to approximately one-half the axial width of the flange body member; and a second lip extending from the second nest end of each flange body member, the second lip having a width of approximately one-half the axial width of the flange body member and being spaced inward from the second axial end face by a second recess equal to approximately one-half the axial width of the flange body member;

wherein to form the complete annular shaft flange, the first lip on the first flange body member is positioned to overlap the second lip on the second flange body member and the second lip on the first flange body member is positioned to overlap the second lip on the second flange body member such that the overlapping lips on the first and second flange body members can be spot welded to join the first and second flange body members in a generally circular shape.

6. The annular shaft flange of claim 5 wherein:

the first lip includes an outer face surface that is generally planar with the second axial end face; and wherein the second lip includes an outer surface that is planar with the first axial end face.

\* \* \* \* \*

UNITED STATES PATENT AND TRADEMARK OFFICE
CERTIFICATE OF CORRECTION

PATENT NO. : 5,857,800
DATED : January 12, 1999
INVENTOR(S) : RICHARD T. NELL

It is certified that error appears in the above-indentified patent and that said Letters Patent is hereby corrected as shown below:

In The Title

In the Title, Cancel "ANNUAL SHAFT FLANGE" and insert ---ANNULAR SHAFT FLANGE---.

Signed and Sealed this

Twenty-seventh Day of July, 1999

*Attest:*

Q. TODD DICKINSON

*Attesting Officer*  Acting Commissioner of Patents and Trademarks